United States Patent

Westhoff et al.

[19]

[11] Patent Number: 6,126,173

[45] Date of Patent: Oct. 3, 2000

[54] EXTRUDED GASKET FOR CORED MANHOLES

[75] Inventors: James A. Westhoff, Langhorne; James A. Kelly, Reiglesville, both of Pa.

[73] Assignee: Poly-Tec Products, Inc., Tullytown, Pa.

[21] Appl. No.: 09/013,841

[22] Filed: Jan. 27, 1998

[51] Int. Cl.[7] .................................................. F16J 15/10
[52] U.S. Cl. ........................ 277/615; 277/626; 277/644
[58] Field of Search ................................... 277/604, 606, 277/607, 615, 626, 627, 650, 944, 644; 285/213, 215, 216

[56] References Cited

U.S. PATENT DOCUMENTS

| | | | |
|---|---|---|---|
| 1,817,774 | 8/1931 | Sipe | 277/615 X |
| 1,817,870 | 8/1931 | Bille | 277/615 |
| 2,230,725 | 2/1941 | Nathan | 285/163 |
| 2,882,073 | 4/1959 | James | 277/615 |
| 2,953,398 | 8/1960 | Haugen et al. | 285/110 |
| 2,991,092 | 7/1961 | MacKay | 285/110 |
| 3,576,329 | 4/1971 | Weaver | 277/207 |
| 3,744,806 | 7/1973 | Keyser | 277/606 |
| 4,343,480 | 8/1982 | Vassallo | 277/207 |
| 5,058,907 | 10/1991 | Percebois et al. | 277/626 |
| 5,649,712 | 7/1997 | Ekholm | 277/607 |

OTHER PUBLICATIONS

Flex–Seal: Sewer Pipe to Manhole Gasket Connection brochure Copyright 1995.

*Primary Examiner*—Anthony Knight
*Attorney, Agent, or Firm*—Volpe and Koenig, P.C.

[57] ABSTRACT

An extruded gasket being formed of a suitable resilient, compressible material through out the body thereof to facilitate controlling critical gap dimensions measured between the components having the gasket arranged in said gap to provide an excellent water-tight seal. The gasket material is of a softer durometer than that of prior art gaskets and includes a relief section providing sufficient mechanical softness to allow the gasket to compress more easily in the region of the relief section.

10 Claims, 3 Drawing Sheets

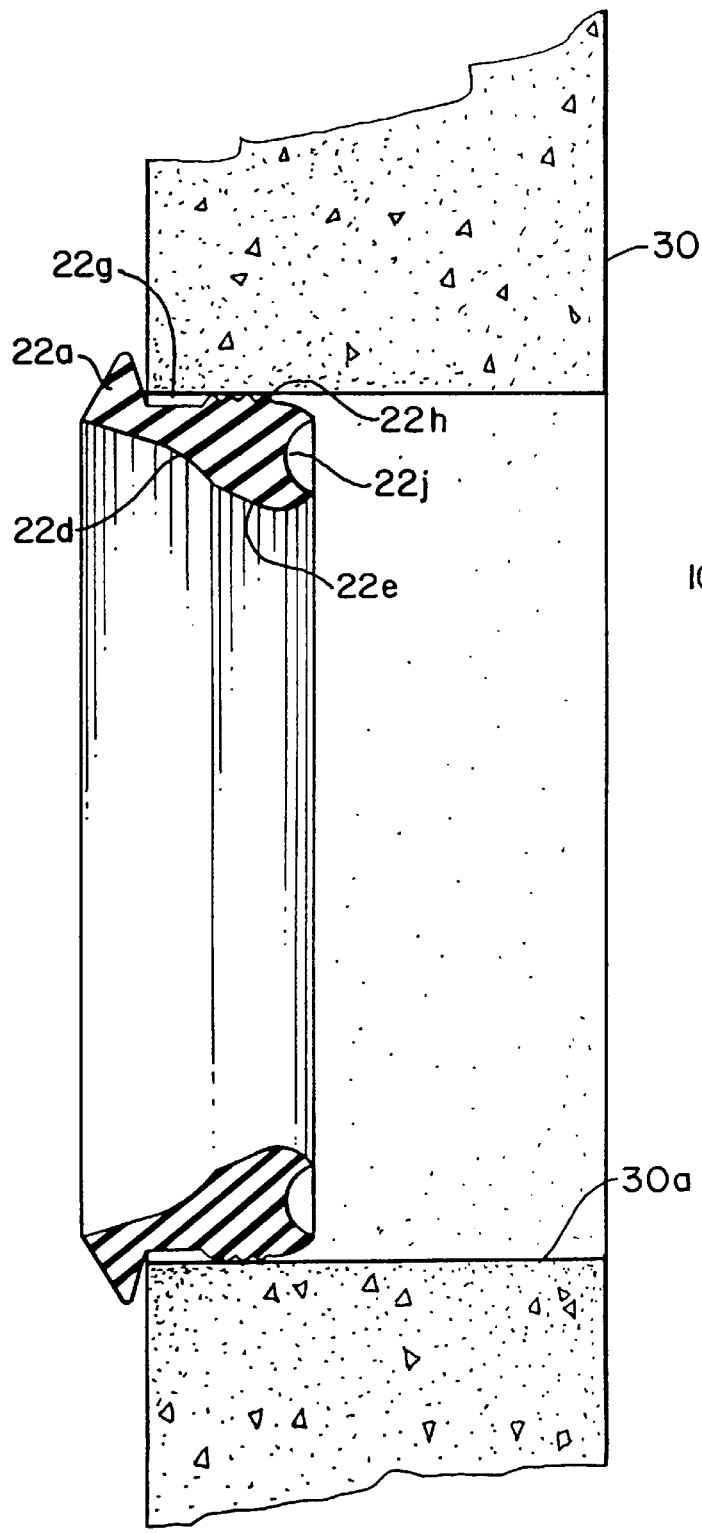
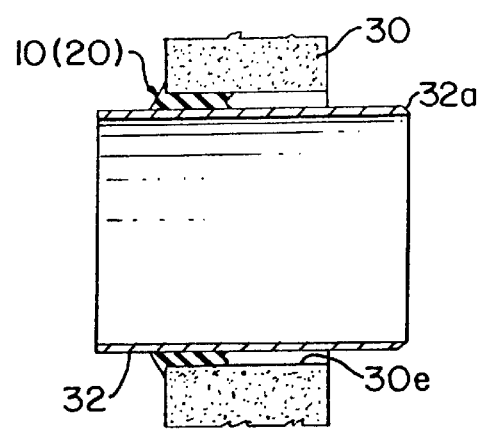
FIG. 3b
FIG. 4

EXTRUDED GASKET FOR CORED MANHOLES

FIELD OF THE INVENTION

The present invention relates to extruded gaskets and more particularly to extruded gaskets providing a wider range of tolerance for use in cored manholes.

BACKGROUND OF THE INVENTION

Resilient, compressible gaskets are typically utilized in cored manholes to provide a water-tight seal between a manhole opening and a pipe extending therethrough.

Manholes are often cored in situ by coring equipment used in the field. Openings in the sidewalls of manholes which are cored in the field typically have wider tolerance ranges than those which are cast in the factory, necessitating the use of gaskets which are capable of providing a good water-tight seal in situations where the gap space between an inner diameter of a cored opening and an outer diameter of a pipe falls within a broader tolerance range.

The prior gaskets utilized in cored manholes typically have a hollow annular cavity whose volume decreases as it changes in cross section due to radial compression when force-fitted between the cored opening in the manhole sidewall and the pipe. In such applications it was necessary to provide a pipe whose outer diameter was more precise relative to the inner diameter of the cored opening, making it difficult to provide an adequate water-tight seal in cored openings wherein the aforesaid gap space falls in a wider tolerance range.

BRIEF DESCRIPTION OF THE INVENTION

The present invention is characterized by comprising an extruded gasket which is formed of a solid mass throughout making it easier to control critical gap dimensions in order to provide a good water-tight seal. The gasket is preferably formed of a material having a softer durometer than that of the prior art gaskets and which incorporates a relief section which provides sufficient mechanical softness, allowing the gasket to compress, thereby providing an adequate water-tight seal between conduit and cored manhole openings over a gap space having a wider tolerance range.

OBJECTS OF THE INVENTION

It is therefore one object of the present invention to provide a novel extruded gasket usable in both cast and cored manholes but especially advantageous for use with cored manholes and the like.

Still another object of the present invention is to provide a novel gasket having a solid interior and which is provided with a relief section allowing the gasket to compress and thereby provide an adequate water-tight seal between a pipe and a cored opening having a wider range of tolerance.

Still another object of the present invention is to provide a gasket which, although having suitable compressibility, has a solid interior, which provides closer and better dimensional stability during the extrusion process.

BRIEF DESCRIPTION OF THE FIGURES

The above as well as other objects of the present invention will become apparent from a consideration of the accompanying drawings in which:

FIGS. 3a and 3b respectively show sectional views of the manner in which gaskets of the type shown in FIG. 1a and FIG. 2a, are inserted.

FIG. 4 is a sectional view showing the manner in which a pipe is inserted into a gasket of the type shown in FIGS. 1a and/or 2a.

DETAILED DESCRIPTION OF THE INVENTION

Figure 1A:
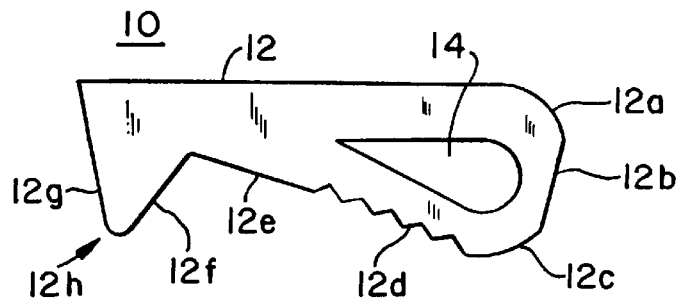
FIGS. 1a and 1b respectively show a sectional view and an enlarged sectional view of a gasket designed in accordance with the prior art.
Figure 1B:
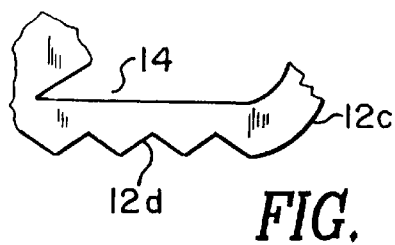

FIG. 1a shows a prior gasket which is preferably an extruded member 10 having a substantially flat wall 12 which extends to the right (in FIG. 7a), providing a curved portion 12a adjoining a flat portion 12b which in turn joins a curved portion 12c. A saw-tooth-shaped portion 12d extends from curved portion 12c diagonally inward toward flat wall 12 and merges into a straight portion 12e.

A V-shaped (i.e. tapered) portion defined by walls 12g and 12f is arranged between planar portions 12 and 12e.

A teardrop-shaped cavity 14 is provided at the curved end of the gasket opposite tapered portion 12h.

The gasket 10 is formed employing an extruding process. The extrusion is cut to a desired length and the free ends thereof are brought together and vulcanized or otherwise joined together or fused to form an annular, closed-loop gasket.

Figure 3A:
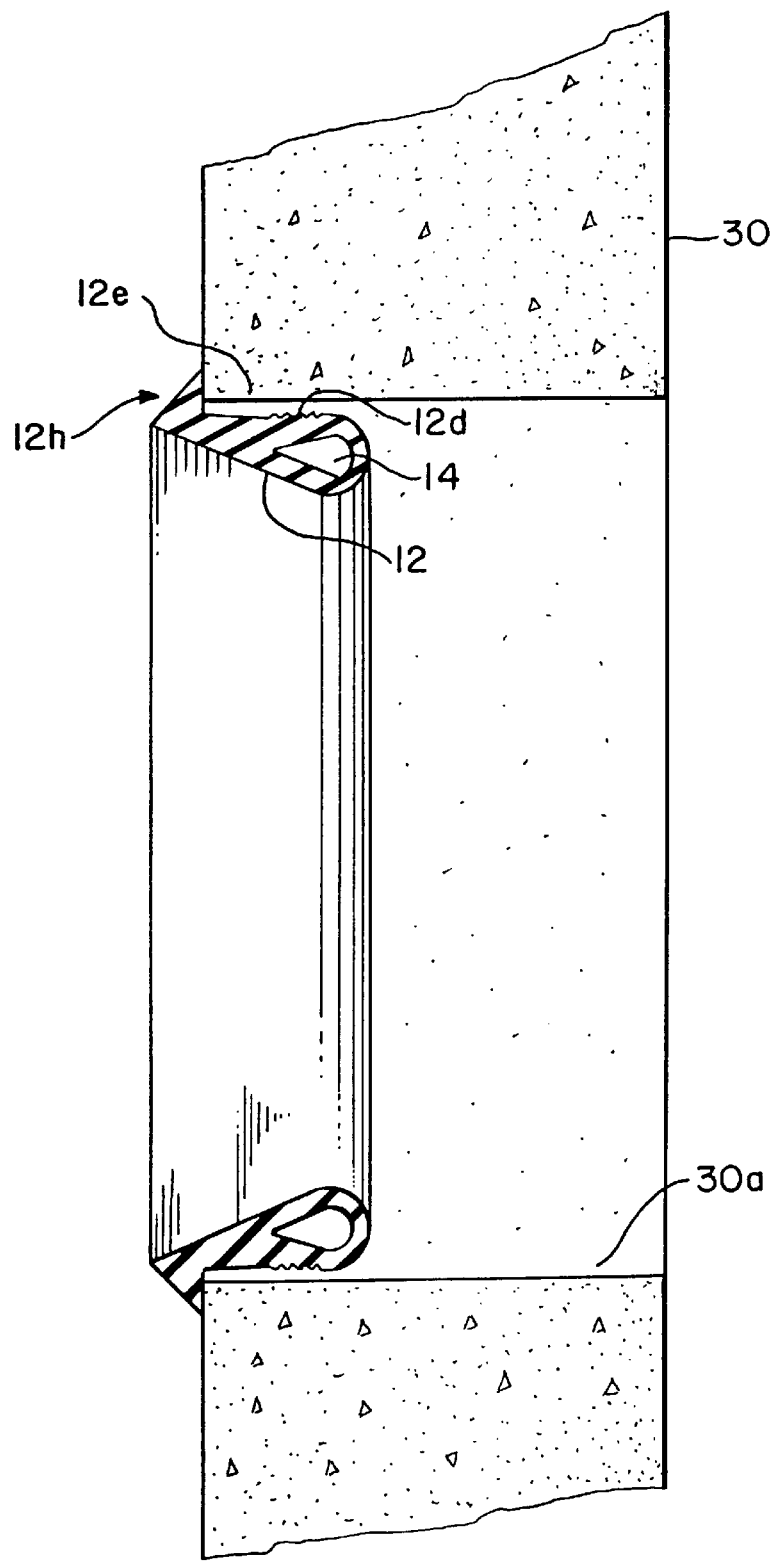

The gasket 10 is inserted into the cored opening 30a in the manhole sidewall 30 with the surface portions 12d and 12e engaging the inner periphery of opening 30a (see FIG. 3a). The tapered portion 12h is just outside of opening 30a and engages a marginal portion of the interior sidewall adjacent to the opening 30a. The gasket 10 which is initially at least partially folded by an amount sufficient to fit into the cored opening, has sufficient inherent resiliency which causes that gasket to resume in annular configuration and thereby seats itself within the opening 30a.

Surface 12 faces the outer periphery of the pipe to be inserted into the cored opening 30a in the manhole sidewall.

Lubricant is applied to surface 12 and the pipe 32 is preferably beveled at 32a (FIG. 4) and a suitable lubricant is applied to the outer periphery of the pipe. The pipe is then inserted (i.e. "pushed") into the central opening formed by the gasket 10.

The cavity 14 enables the gasket to change its volume according to the gap spacing between the inner periphery of the cored opening and the outer periphery of the pipe, the smaller the gap space between the pipe and the cored opening 30a, the greater the reduction in volume of the hollow interior cavity 14. In applications where the gap space between the outer periphery of the pipe and the inner periphery of the cored opening is great, the gasket is not able to provide a sufficient water-tight seal therebetween.

Figure 2A:
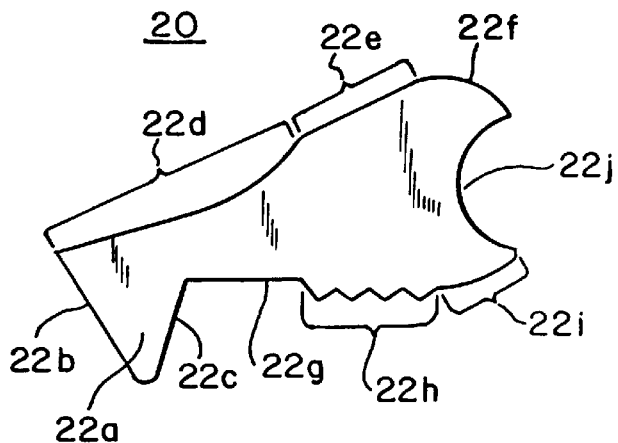
FIGS. 2a and 2b respectively show a sectional view and an enlarged sectional view of a gasket embodying the principles of the present invention.
Figure 2B:
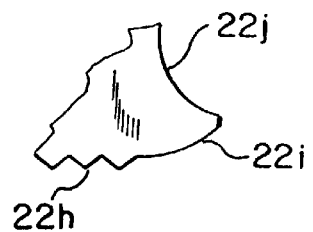

FIGS. 2a and 2b show the gasket 20 of the present invention which is provided with a tapered projection 22a similar to the tapered projection 12h in the conventional gasket, which projection is formed by planar sidewalls 22b and 22c. The surface joined to the upper end of planar surface 22b, contrary to the arrangement shown in the gasket 10, is provided with a curved concave portion 22d which merges with a flat portion 22e which in turn merges with a curved convex portion of 22f.

The upper end of planar surface 22c merges with a flat wall 22g which in turn merges with a sawtooth shaped portion 22h which then merges with a curved convex portion 22i.

Gasket 20 is provided with a curved concave portion 22j which extends between curved convex portions 22f and 22i arranged and the end of the gasket opposite the tapered portion 22a.

The interior of gasket 20 is solid throughout and is preferably made of a rubber of softer durometer than the gasket 10, such as, for example, a durometer in the range of from 40 to 45.

Gasket 20, in a manner similar to gasket 10, is preferably extruded, although it can be molded. When extruded, the extruded member is cut to a predetermined length, and the free ends are brought together and are vulcanized or otherwise fused together to form an annular, closed-loop gasket. Gasket 20 is inserted into the cored opening 30e in the same manner as prior art gasket 10 (see FIG. 3b).

The gasket 20 and pipe 32 are lubricated in the manner set forth above and the beveled end of the pipe is pushed into the central opening formed by the gasket.

The degree of compressibility of the gasket is significantly less than that of gasket 10. However, gasket 20 has the important characteristic of providing more controlled radial compression than gasket 10 in order to provide a snug fit within the internal cored opening and between the outer diameter of the pipe and the outer diameter of the pipe and the inner diameter of said opening.

The concavity 22j provides adequate mechanical softness allowing the gasket to compress thereby providing a wider range of tolerance of the size of the gap space between the outer periphery of the pipe and the inner periphery of the cored opening.

The curved section 22d facilitates initial insertion of the pipe 32 while section 22e which causes a greater increase in thickness of gasket 20 at the right hand-end of the gasket than the gasket 10, which increases in thickness in a linear fashion, provides a gasket portion of greater thickness which provides an effective water-tight seal. The concavity 22j enables the gasket to yield sufficiently, when necessary, to accommodate smaller gap distances between the pipe 32 and hole 30a.

Although the gasket 20 is shown inserted into a manhole opening, gasket 20 which may be produced in a range of diameters, may also be used to make connection of a house pipe (of copper or plastic) into a cored opening in a concrete pipe.

A latitude of modification, change and substitution is intended in the foregoing disclosure, and in some instances, some features of the invention will be employed without a corresponding use of other features. Accordingly, it is appropriate that claims of the invention, when presented, be construed broadly and in a manner consistent with the spirit and scope of the invention herein described.

What is claimed is:

1. In combination, a cast member having an opening; a conduit extending therethrough and an annular gasket for providing a watertight seal between the opening in said cast member and said conduit extending there through, an outer surface of said conduit engaging said gasket, said conduit extending through said gasket over an entire length of said gasket, said gasket being solid throughout and being formed of a resilient compressible material, said gasket generally tapering from a first end thereof toward a second end and being provided near said second end with a tapered projection which extends outside of said opening and in an outward radial direction away from said opening so as to rest against a marginal portion surrounding the opening while the remaining portion of the gasket extends into said opening so that said gasket gradually increases in thickness from said tapered projection towards said first end to undergo gradually increasing compression upon insertion of the conduit into the second end of the gasket so as to gradually compress the gasket as the conduit moves through the gasket; and said first end of said gasket having a shallow curved concave annular recess which provides compression relief to increase yieldability and compressibility of the gasket near said first end and provide a more controlled compression of the gasket near said first end and for providing a good water-tight fit for a conduit of reduced diameter as compared with gaskets utilizing a hollow space therein.

2. The combination of claim 1 wherein an outer surface of the annular gasket is provided with an array of saw-tooth-shaped grooves to enhance gripping of the gasket against an interior periphery of said opening to prevent slippage of the gasket relative to the cast member.

3. The combination of claim 1 and wherein surfaces adjacent to and on opposite sides of said concave recess are curved convex surfaces merging with opposite edges of said curved concave recess.

4. The combination of claim 1 wherein a surface of said gasket extending between said tapered projection and said first end has a substantially flat surface extending at one end from said tapered projection and a corrugated surface extending between said flat surface and said first end.

5. The combination of claim 1 wherein said gasket is an extruded member which is cut to a predetermined length, said gasket being bent to bring the free ends thereof into intimate engagement, which free ends are vulcanized or otherwise fused to form a closed-loop gasket.

6. The combination of claim 1 wherein an interior surface of said opening engaging said gasket is smooth and linear in an axial direction of said opening.

7. In combination, a cast member having an opening; a conduit extending therethrough and an annular gasket for providing a watertight seal between the opening in said cast member and said conduit extending there through, said gasket being solid throughout and being formed of a resilient compressible material, said gasket generally tapering from a first end thereof toward a second end and being provided near said second end with a tapered projection which extends outside of said opening and in an outward radial direction away from said opening so as to rest against a marginal portion surrounding the opening while the remaining portion of the gasket extends into said opening so that said gasket gradually increases in thickness from said tapered projection towards said first end to undergo gradually increasing compression upon insertion of the conduit into the second end of the gasket so as to gradually compress the gasket as the conduit moves through the gasket;

said first end of said gasket having a shallow curved concave annular recess which provides compression relief to increase yieldability and compressibility of the gasket near said first end and provide a more controlled compression of the gasket near said first end and for providing a good water-tight fit for a conduit of reduced diameter as compared with gaskets utilizing a hollow space therein;

wherein surfaces adjacent to and on opposite sides of said concave recess are curved convex surfaces merging with opposite edges of said curved concave recess; and wherein a surface of said gasket opposite said tapered projection has a curved concave shape merging into a substantially planar surface which in turn merges with one of said curved convex surfaces.

8. In combination, a cast member having an opening; a conduit extending therethrough and an annular gasket for providing a watertight seal between the opening in said cast member and said conduit extending there through, said gasket being solid throughout and being formed of a resilient compressible material, said gasket generally tapering from a first end thereof toward a second end and being provided near said second end with a tapered projection which extends outside of said opening and in an outward radial direction away from said opening so as to rest against a marginal portion surrounding the opening while the remaining portion of the gasket extends into said opening so that said gasket gradually increases in thickness from said tapered projection towards said first end to undergo gradually increasing compression upon insertion of the conduit into the second end of the gasket so as to gradually compress the gasket as the conduit moves through the gasket; and said first end of said gasket having a shallow curved concave annular recess which provides compression relief to increase yieldability and compressibility of the gasket near said first end and provide a more controlled compression of the gasket near said first end and for providing a good water-tight fit for a conduit of reduced diameter as compared with gaskets utilizing a hollow space therein and wherein said gasket is formed of a rubber-like material having a durometer in a range from 40 to 45.

9. In combination, a cast member having an opening; a conduit extending therethrough and an annular gasket for providing a watertight seal between the opening in said cast member and said conduit extending there through, said gasket being solid throughout and being formed of a resilient compressible material, said gasket generally tapering from a first end thereof toward a second end and being provided near said second end with a tapered projection which extends outside of said opening and in an outward radial direction away from said opening so as to rest against a marginal portion surrounding the opening while the remaining portion of the gasket extends into said opening so that said gasket gradually increases in thickness from said tapered projection towards said first end to undergo gradually increasing compression upon insertion of the conduit into the second end of the gasket so as to gradually compress the gasket as the conduit moves through the gasket;

said first end of said gasket having a shallow curved concave annular recess which provides compression relief to increase yieldability and compressibility of the gasket near said first end and provide a more controlled compression of the gasket near said first end and for providing a good water-tight fit for a conduit of reduced diameter as compared with gaskets utilizing a hollow space therein and wherein a minimal thickness of said gasket measured in a radial direction across a cross-section thereof extends over a given length of the gasket measured in a direction lateral to the radial direction where said tapered projection is joined to a main body portion of the gasket, due to a curved concave surface provided on a side of the gasket opposite said tapered projection.

10. In combination, a cast member having an opening, a conduit extending therethrough and an annular gasket for providing a watertight seal between the opening in said cast member and said conduit extending there through, said gasket being solid throughout and being formed of a resilient compressible material, said gasket generally tapering from a first end thereof toward a second end and being provided near said second end with a tapered projection which extends outside of said opening and in an outward radial direction away from said opening so as to rest against a marginal portion surrounding the opening while the remaining portion of the gasket extends into said opening so that said gasket gradually increases in thickness from said tapered projection towards said first end to undergo gradually increasing compression upon insertion of the conduit into the second end of the gasket so as to gradually compress the gasket as the conduit moves through the gasket;

said first end of said gasket having a shallow curved concave annular recess which provides compression relief to increase yieldability and compressibility of the gasket near said first end and provide a more controlled compression of the gasket near said first end and for providing a good water-tight fit for a conduit of reduced diameter as compared with gaskets utilizing a hollow space therein and wherein the surface of the gasket between said tooth-shaped grooves and said second end is recessed to provide a free space between said gasket and said opening to facilitate initial entry of said conduit into the second end of said gasket.

* * * * *